United States Patent [19]

Nishimoto

[11] Patent Number: 4,691,248
[45] Date of Patent: Sep. 1, 1987

[54] SYNCHRONIZED SIGNAL SEPARATING CIRCUIT FOR A RECORDING AND REPRODUCING APPARATUS

[75] Inventor: Naomichi Nishimoto, Tachikawa, Japan

[73] Assignee: Victor Company of Japan, Japan

[21] Appl. No.: 865,464

[22] Filed: May 21, 1986

Related U.S. Application Data

[62] Division of Ser. No. 628,500, Jul. 6, 1984, Pat. No. 4,616,270.

[30] Foreign Application Priority Data

Jul. 14, 1983 [JP] Japan ................. 58-128222
Jul. 14, 1983 [JP] Japan ................. 58-128223

[51] Int. Cl.$^4$ .................. H04N 5/08; H04N 5/93
[52] U.S. Cl. ............................ 358/320; 358/153
[58] Field of Search ............... 358/310, 319, 320, 148, 358/150, 153, 155

[56] References Cited

U.S. PATENT DOCUMENTS

| | | | |
|---|---|---|---|
| 4,335,393 | 6/1982 | Pearson | 358/310 |
| 4,616,270 | 10/1986 | Nishimoto | 358/320 |
| 4,626,929 | 12/1986 | Ichinoi et al. | 358/310 |
| 4,628,369 | 12/1986 | Ichinoi et al. | 358/314 |
| 4,641,201 | 2/1987 | Ichinoi et al. | 358/310 |

*Primary Examiner*—Donald McElheny, Jr.
*Attorney, Agent, or Firm*—Andrus, Sceales, Starke & Sawall

[57] ABSTRACT

A synchronizing signal separating circuit comprises an input terminal for receiving a composite color video signal to be recorded at the time of a recording, and for receiving a time-division-multiplexed signal at the time of a reproduction, a measuring circuit for measuring a time interval between a time when a horizontal synchronizing signal within an input signal received through the input terminal assumes a first predetermined value and a time when the horizontal synchronizing signal assumes a second predetermined value, a memory circuit having various correcting data pre-stored therein, for producing one correcting data in accordance with the time interval measured by the measuring circuit, and a signal generating circuit for generating the separated horizontal synchronizing signal at a time position in accordance with the one correcting data which is produced from the memory circuit. The various correcting data are pre-stored in the memory circuit for each of various time intervals required for the horizontal synchronizing signal to reach the second predetermined value from the first predetermined value, and contain data for constantly generating a separated horizontal synchronizing signal at a time position which is approximately constant in each of the various time intervals.

3 Claims, 15 Drawing Figures

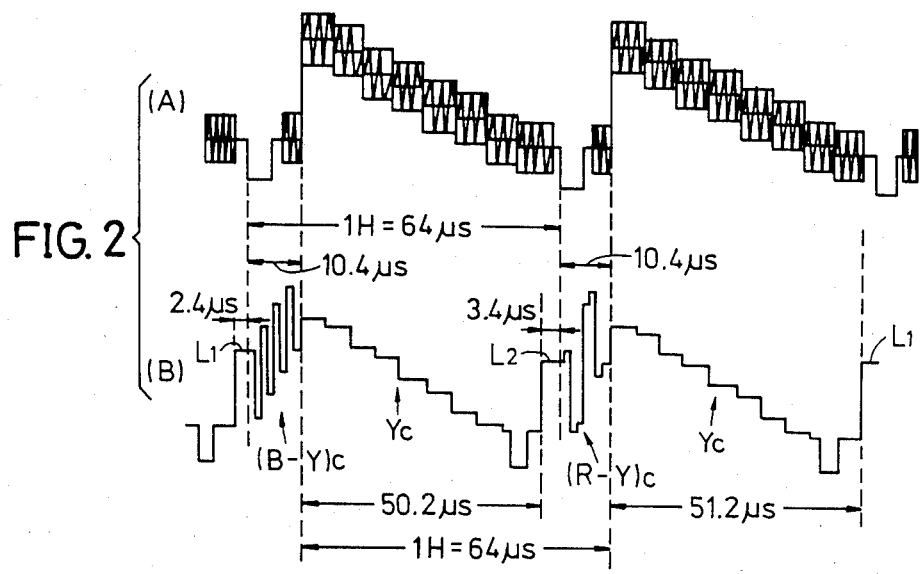
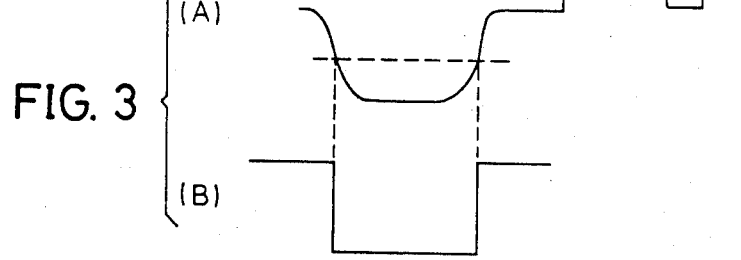
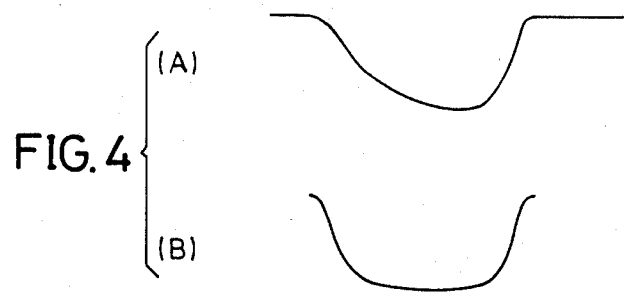

SYNCHRONIZED SIGNAL SEPARATING CIRCUIT FOR A RECORDING AND REPRODUCING APPARATUS

This application is a division of application Ser. No. 06/628,500, filed July 6, 1984, now U.S. Pat. No. 4,616,270.

BACKGROUND OF THE INVENTION

The present invention generally relates to synchronizing signal separating circuits for recording and reproducing apparatuses which record and reproduce time-division-multiplexed color video signals, and more particularly to a synchronizing signal separating circuit for a recording and reproducing apparatus which subjects a time-division-multiplexed color video signal to a frequency modulation and records the frequency modulated signal on a recording medium. The time-division-multiplexed color video signal is obtained by subjecting a luminance signal and a line-sequential color difference signal to a time base compression, and time-division-multiplexing the time base compressed signals together with an achromatic level signal. At the time of a reproduction, the recording and reproducing apparatus frequency-demodulates the frequency modulated signal which is reproduced from the recording medium, and subjects the frequency demodulated signal to a time base expansion so as to obtain a reproduced color video signal. The synchronizing signal separating circuit according to the present invention satisfactorily separates a synchronizing signal within a reproduced time-division-multiplexed color video signal which is obtained by the frequency demodulation carried out in the recording and reproducing apparatus at the time of the reproduction.

Among the existing color video signal recording and reproducing apparatuses such as video tape recorders (VTRs), the more popular recording and reproducing apparatuses separate a luminance signal and a carrier chrominance signal from a standard system composite color video signal. The standard system is a system such as the NTSC system, the PAL system, and the SECAM system. The separated luminance signal is frequency-modulated, and the separated carrier chrominance signal is frequency-converted into a low frequency range. The frequency converted carrier chrominance signal is frequency-division-multiplexed with the frequency modulated luminance signal and recorded on a recording medium. At the time of the reproduction, a signal processing opposite to the signal processing carried out at the time of the recording, is carried out to obtain a reproduced composite color video signal which is in conformance with the original standard system. In other words, the more popular recording and reproducing apparatuses employ the so-called low-band-conversion recording and reproducing system.

Other various recording and reproducing systems have been proposed besides the low-band-conversion recording and reproducing system. For example, there was a proposed recording and reproducing apparatus which was designed to subject two kinds of color difference signals which are obtained by frequency-demodulating the carrier chrominance signal to a time base compression, and also subject the luminance signal to a time base compression. According to this proposed recording and reproducing apparatus, the time base compressed signals are time-division-multiplexed, and the time division multiplexed signal is frequency-modulated and recorded on the recording medium. At the time of the reproduction, a signal processing opposite to the signal processing carried out at the time of the recording, is carried out to obtain a reproduced composite color video signal which is in conformance with the original standard system. An example of such a recording and reproducing apparatus may be found in the U.S. Pat. Nos. 3,781,463 and 4,245,235, for example. This proposed recording and reproducing apparatus takes into account the difference in the bands of the luminance signal and the color difference signals, and takes measures so that the color difference signals having the narrower band can be transmitted within the horizontal blanking period. In other words, one of the color difference signals which is transmitted within one horizontal scanning period (1H), is subjected to a time base compression into approximately 20% of 1H. In addition, to utilize the band effectively, the luminance signal is subjected to a time base compression into approximately 80% of 1H so as to occupy a band which is in the same range as the band of the time base compressed color difference signal, and transmitted. Further, the two color difference signals are time-division-multiplexed, as a line-sequential signal in which the two color difference signals are alternately transmitted for every 1H, with the time base compressed luminance signal. This time-division-multiplexed signal is supplied to a frequency modulator, and an output signal of the frequency modulator is recorded on the recording medium. At the time of the reproduction, a signal processing opposite to the signal processing carried out at the time of the recording, is carried out to obtain a reproduced composite color video signal. The recording and reproducing system employed in this proposed recording and reproducing apparatus, will hereinafter be referred to as a timeplex system.

According to the timeplex system which transmits the time-division-multiplexed signal, there is no period in which the luminance signal and the color difference signal are transmitted simultaneously. In the case of the NTSC system color video signal and the PAL system color video signal, a mutual interference and moire may occur between the luminance signal and the color difference signals, because the luminance signal and the carrier chrominance signal are band-share-multiplexed and transmitted. However, such a mutual interference and moire will not occur according to the timeplex system. In addition, even when the color video signal of any one of the NTSC system, the PAL system, and the SECAM system is recorded by an azimuth recording and reproducing system on tracks having the horizontal synchronizing signals recorded in non-alignment between mutually adjacent tracks and then reproduced, there is substantially no crosstalk from the adjacent tracks due to the azimuth loss effect, and it is possible to obtain a reproduced picture of a high picture quality. This is because the time-division-multiplexed signal is recorded on the adjacent tracks in the form of a frequency modulated signal which is obtained by frequency-modulating by the time-division-multiplexed signal a high-frequency carrier which has a large azimuth loss effect.

The time base compressed luminance signal and the time base compressed color difference signal employed in the timeplex system, both have an energy distribution in which the energy is large in the low frequency range and the energy is small in the high frequency range. In other words, the time base compressed luminance signal and the time base compressed color difference signal assume a signal format which is suited for the frequency modulation. Thus, it is possible to obtain a large modulation index, and the signal-to-noise ratio can be greatly improved. Moreover, it is possible to substantially eliminate a deviation in the reproducing time base when expanding the time base.

In the conventional recording and reproducing apparatus which employs the timeplex system, the horizontal synchronizing signal is separated from the reproduced time-division-multiplexed color video signal at the time of the reproduction, in a synchronizing signal separating circuit. The reproduced horizontal synchronizing signal which is separated in the synchronizing signal separating circuit, is differentiated to obtain a pulse. A time position of this pulse is used as a reference to separate the reproduced time base compressed luminance signal and the reproduced time base compressed line-sequential color difference signal from the reproduced time-division-multiplexed color video signal. Further, the time position of this pulse is also used to determine a starting point of the write-in and read-out into and from a memory circuit for the purpose of performing the time base expansion. Accordingly, the separation of the horizontal synchronizing signal plays an important role in the recording and reproducing apparatus which employs the timeplex system.

Generally, the synchronizing signal separating circuit is designed to slice the horizontal synchronizing signal at approximately one-half the peak value of the horizontal synchronizing signal, and to form a horizontal synchronizing signal detection pulse at the point in time when the slicing takes place, in order to avoid the effects of noise or the like which mixes into the horizontal synchronizing signal. The horizontal synchronizing signal detection pulse is produced from the synchronizing signal separating circuit as a separated horizontal synchronizing signal. Hence, it is possible to accurately separate the horizontal synchronizing signal without being affected by noise which is mixed at the synchronizing tip level position and the pedestal level position.

However, depending on the recording and reproducing characteristics or the like, the waveform of the reproduced horizontal synchronizing signal may become distorted or different from the original waveform of the horizontal synchronizing signal. Moreover, the deviation of the waveform of the reproduced horizontal synchronizing signal from the original waveform, is not constant. In other words, the slope of the leading edge of the reproduced horizontal synchronizing signal is sometimes small and sometimes sharp. For this reason, in the conventional synchronizing signal separating circuit, there are cases where the time it takes for the reproduced horizontal synchronizing signal to reach substantially one-half the peak value from the starting time of the horizontal synchronizing signal, is not constant. In these cases, it is impossible to perfectly separate the reproduced time base compressed luminance signal and the reproduced time base compressed line-sequential color difference signal, and a dropout may occur in a part of the reproduced color difference signals and the reproduced luminance signal. In addition, because the time base expansion ratios are different for the reproduced time base compressed luminance signal and the reproduced time base compressed line-sequential color difference signal, a relative time deviation is introduced between the reproduced luminance signal and the reproduced color difference signals which are obtained by the time base expansion, due to the imperfect separation of the horizontal synchronizing signal in the synchronizing signal separating circuit. As a result, there is a problem in that each color information are not displayed at the correct positions in the reproduced picture due to the above relative time deviation.

SUMMARY OF THE INVENTION

Accordingly, it is a general object of the present invention to provide a novel and useful synchronizing signal separating circuit for a recording and reproducing apparatus which records and reproduces a time-division-multiplexed color video signal, in which the problems described heretofore have been eliminated.

Another and more specific object of the present invention is to provide a synchronizing signal separating circuit in which a time interval between a time when an input reproduced horizontal synchronizing signal reaches a first predetermined level (30% level, for example) and a time when the input reproduced horizontal synchronizing signal reaches a second predetermined level (70% level, for example) is measured to obtain a counted value which is indicative of the degree of the waveform distortion in the input reproduced horizontal synchronizing signal. Time deviations between a leading edge of a pulse obtained by detecting a regular (correct) reproduced horizontal synchronizing signal and a leading edge of a pulse obtained by detecting the input reproduced horizontal synchronizing signal, are calculated in advance and stored into a memory in the form of a table. A data corresponding to the above counted value is obtained from the stored table within the memory. This data is used to obtain a reproduced horizontal synchronizing signal, and this reproduced horizontal synchronizing signal is produced as a separated reproduced horizontal synchronizing signal which is separated from a reproduced signal. According to the synchronizing signal separating circuit of the present invention, even when there is a waveform distortion in the reproduced horizontal synchronizing signal, it is possible to obtain from the table stored within the memory, data containing the accurately corrected time position of the horizontal synchronizing signal depending on the degree of the waveform distortion. For this reason, it is always possible to obtain the separated horizontal synchronizing signal with the correct time position. In addition, since the data in accordance with the degree of waveform distortion is obtained by looking up the table stored within the memory, the data containing the accurately corrected time position of the horizontal synchronizing signal can be obtained without the need for a calculation time. As a result, it is possible to perform a real-time correction of the reproduced horizontal synchronizing signal by use of a circuit having a simple circuit construction.

Still another object of the present invention is to provide a synchronizing signal separating circuit which records an achromatic level signal (discriminating timing signal) for discriminating color difference signals, with a level approximately in the center of a synchronizing tip level and a while peak level, at the time of a recording. At the time of a reproduction, a pulse is obtained by separating the achromatic level signal from a reproduced signal and differentiating the separated achromatic level signal, and this pulse is produced as a separated horizontal synchronizing signal which is separated from the reproduced signal. According to the synchronizing signal separating circuit of the present invention, an emphasized achromatic level signal will not be clipped in a white clipping circuit or a dark clipping circuit which is required when a recording signal is passed through an emphasis circuit for the purpose of reducing noise as is done in a recording system of a VTR, because the level of the achromatic level signal is approximately the center of the synchronizing tip level and the white peak level. Hence, it is easy to detect an edge of the achromatic level signal in a reproducing system. Further, since the achromatic level signal is uneasily affected by noise, it is possible to detect the reproduced achromatic level signal with the correct time position. Accordingly, it is possible to accurately separate a reproduced time base compressed luminance signal or a reproduced time base compressed line-sequential color difference signal from a reproduced time-division-multiplexed color video signal. It is possible to prevent a dropout in the reproduced color difference signals or the like, and prevent the color information from being displayed at incorrect positions in the reproduced picture.

Other objects and further features of the present invention will be apparent from the following detailed description when read in conjunction with the accompanying drawings.

BRIEF DESCRIPTION OF THE DRAWINGS

FIGS. 2(A) and 2(B) respectively show signal waveforms for explaining the operation of the block system shown in FIG. 1;

FIGS. 3(A) and 3(B) respectively show examples of a reproduced horizontal synchronizing signal and an output signal waveform of the synchronizing signal separating circuit;

FIGS. 4(A) and 4(B) respectively show other examples of the reproduced horizontal synchronizing signal;

DETAILED DESCRIPTION

Figure 1:
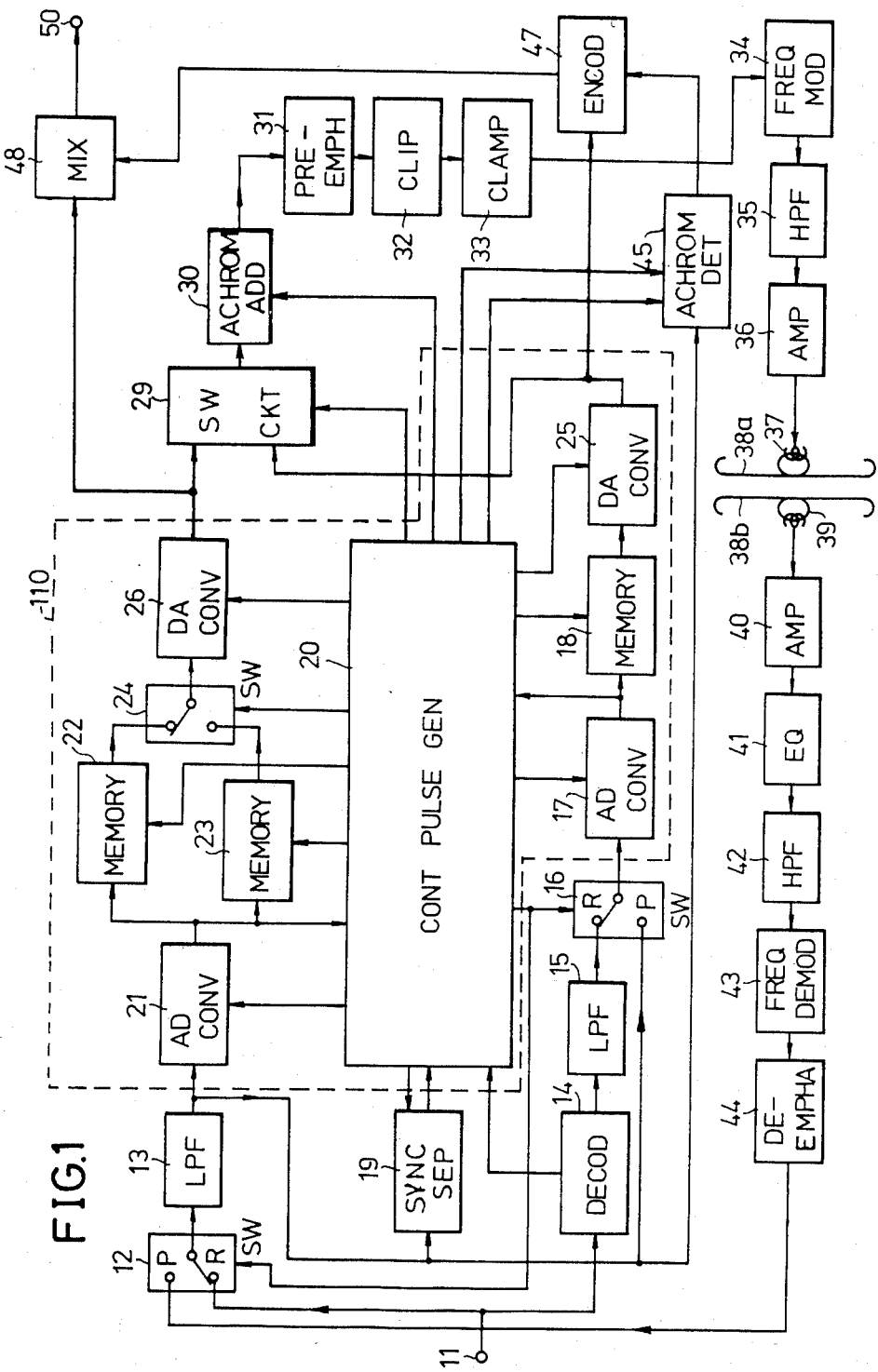
FIG. 1 is a systematic block diagram showing an embodiment of a synchronizing signal separating circuit according to the present invention together with a recording and reproducing apparatus.

First, description will be given with respect to the general operations of a recording and reproducing apparatus having the synchronizing signal separating circuit according to the present invention at the time of a recording and a reproduction. At the time of the recording, an input SECAM system color video signal, for example, is applied to an input terminal 11 shown in FIG. 1. The input color video signal is supplied to a lowpass filter 13 wherein a luminance signal is separated, through a switching circuit 12 which is connected to a terminal R. On the other hand, the input color video signal is supplied to a decoder 14 wherein a carrier chrominance signal is frequency-selected and then demodulated into a line-sequential color difference signal. In a case where the input color video signal is of the PAL system or the NTSC system, the carrier chrominance signal comprises two kinds of color difference signals which are subjected to a carrier suppression quadrature modulation, but also in this case, the carrier chrominance signal is converted into the line-sequential color difference signal in the decoder 14. Detailed description on the decoder 14 will not be given in the specification, because the decoder 14 is not directly related to the subject matter of the present invention.

The line-sequential color difference signal is subjected to a D.C. level shift, so that the D.C. level of the achromatic color part of one color difference signal coincides with the D.C. level of the achromatic color part of the other color difference signal, before being supplied to an analog-to-digital (AD) converter 17 through a lowpass filter 15 and a switching circuit 16. An output signal of the AD converter 17, is supplied to a memory circuit 18.

On the other hand, the luminance signal which is separated from the input SECAM system color video signal, is obtained from the lowpass filter 13. This luminance signal is supplied to a synchronizing signal separating circuit 19 wherein a horizontal synchronizing signal is separated. The separated horizontal synchronizing signal from the synchronizing signal separating circuit 19 is supplied to a control pulse generating device 20, together with a pulse which is obtained from a part of the decoder 14. The luminance signal from the lowpass filter 13 is also supplied to an AD converter 21 wherein the luminance signal is subjected to an analog-to-digital conversion. An output signal of the AD converter 21 is supplied to memory circuits 22 and 23. As will be described later on in the specification, the memory circuits 18, 22, and 23 are each made up from a random access memory (RAM) and an address counter. Output digital signals of the AD converters 17 and 21 are supplied to the control pulse generating device 20. As will be described in detail later on in the specification, the control pulse generating device 20 generates various control pulses, and supplies the control pulses to the AD converters 17 and 21, the switching circuits 16, 24, and 29, and digital-to-analog (DA) converting circuits 25 and 26. In addition, the control pulse generating device 20 generates a write-in clock pulse and a read-out clock pulse with a predetermined timing and with a predetermined repetition frequency, and supplies these write-in and read-out clock pulses to the memory circuits 18, 22, and 23.

In other words, the control pulse generating device 20 supplies a write-in clock pulse of 16 MHz, for example, to one of the memory circuits 22 and 23, so as to write into the one of the memory circuits 22 and 23 a luminance signal which corresponds to a period of 1H (H represents a horizontal scanning period) and is transmitted within a video period of 52 μs. At the same time, the control pulse generating device 20 supplies a read-out clock pulse of 20 MHz, for example, to the other of the memory circuits 22 and 23 immediately after the transmission of a time base compressed color difference signal corresponding to 1H (52 μs) is completed, so as to read out from the other of the memory circuits 22 and 23 a stored luminance signal which corresponds to 1H and was transmitted 1H before. The read-out clock pulse is supplied to the other of the memory circuits 22 and 23 for a period which excludes from the period of 1H a serial transmission period in which the horizontal synchronizing signal and the time base compressed color difference signal are transmitted. The write-in clock pulse is alternately supplied to the memory circuits 22 and 23, for every 1H. On the other hand, the read-out clock pulse is supplied to the memory circuit 22 or 23 which is not carrying out the write-in operation, for a period in the range of 4H/5 (64 μs in this case). The switching circuit 24 which is coupled to output sides of the memory circuits 22 and 23, is switched over in response to a control pulse from the control pulse generating device 20 so as to selectively pass an output signal of the memory circuit 22 or 23 which is carrying out the read-out operation. As a result, a luminance signal which has been time base compressed to 4/5, is intermittently obtained from the switching circuit 24 without a dropout of information. This time base compressed luminance signal from the switching circuit 24, is subjected to a digital-to-analog conversion in the DA converting circuit 26 and is then supplied to a switching circuit 29.

On the other hand, the line-sequential color difference signal which is produced from the switching circuit 16, is subjected to an analog-to-digital conversion in the AD converter 17 before being supplied to the memory circuit 18. The line-sequential color difference signal which is transmitted in a video period of 52 μs within 1H (=64 μs), is written into the memory circuit 18 in response to a write-in clock pulse of 4 MHz, for example, which write-in clock pulse is received from the control pulse generating device 20. After this write-in operation is completed, a color difference signal which has been time base compressed to 1/5 is read out from the memory circuit 18 in response to a read-out clock pulse of 20 MHz, for example, which read-out clock pulse is received from the control pulse generating device 20. In this case, one read-out period lasts for 10.4 μs.

The time base compressed line-sequential color difference signal from the memory circuit 18, is subjected to a digital-to-analog conversion in the DA converting circuit 25 before being supplied the switching circuit 29. The switching operation of the switching circuit 29 is controlled responsive to a switching pulse (shown in FIG. 13(J) from the control pulse generating device 20. The switching pulse will be described later on in the specification. The switching circuit 29 selectively passes the time base compressed luminance signal and the time base compressed line-sequential color difference signal, to produce a time-division-multiplexed color video signal in which the time base compressed luminance signal and the time base compressed line-sequential color difference signal are time-division-multiplexed. This time-division-multiplexed color video signal is supplied to an achromatic level signal adding circuit 30. The achromatic level signal adding circuit 30 adds an achromatic level signal at a time position immediately prior to the time base compressed line-sequential color difference signal, responsive to a control pulse from the control pulse generating device 20. As will be described later on in the specification, the achromatic level signal is a pulse signal for discriminating the color difference signals, and has a period of 2H. The level of the achromatic level signal is selected to the center of a level range between a pedestal level and a white peak level of the time-division-multiplexed color video signal which is to be recorded, that is, to one-half the maximum amplitude of the color difference signals. Further, the pulse width of the achromatic level signal alternately changes for every 1H.

When a SECAM system color video signal such as a color bar signal shown in FIG. 2(A) is applied to the input terminal 11, a time-division-multiplexed color video signal shown in FIG. 2(B) is obtained from the achromatic level signal adding circuit 30. As shown in FIG. 2(B), the time-division-multiplexed color video signal comprises within a period of 1H (=64 μs), one of the time base compressed color difference signals $(B-Y)_c$ and $(R-Y)_c$ which is transmitted in a period of 10.4 μs, the achromatic level signal L1 or L2 positioned immediately prior to the time base compressed color difference signal which is transmitted, and the time base compressed luminance signal $Y_c$ positioned immediately prior to the achromatic level signal. The time base compressed color difference signals $(B-Y)_c$ and $(R-Y)_c$ are obtained by time-base-compressing the color difference signals $(B-Y)$ and $(R-Y)$ in the video period of 52 μs by 1/5. A transmission period in which the time base compressed luminance signal $Y_c$ and the achromatic level signal are transmitted in time-sequence with the achromatic level signal positioned immediately subsequent to the time base compressed luminance signal $Y_c$, is selected to a period of 53.6 μs (=64−10.4). The transmission period of the achromatic level signal L1 is selected to 2.4 μs, for example, and the transmission period of the achromatic level signal L2 is selected to 3.4 μs, for example.

The time-division-multiplexed color video signal is supplied to a recording head 37 through a known recording signal processing circuit within the recording and reproducing apparatus. This recording signal processing circuit comprises a pre-emphasis circuit 31, a white peak level clipping circuit 32, a clamping circuit 33, a frequency modulator 34, a highpass filter 35, and a recording amplifier 36. Thus, the time-division-multiplexed color video signal is recorded on a magnetic tape 38a by the recording head 37.

Next, description will be given with respect to the operation of the apparatus shown in FIG. 1 at the time of the reproduction. At the time of the reproduction, the switching circuits 12 and 16 are connected to respective terminals P. A reproducing head 39 reproduces from a magnetic tape 38b, a signal which is identical to the time-division-multiplexed signal which was recorded on the magnetic tape 38a at the time of the recording. The frequency modulated signal which is reproduced by the reproducing head 39, is passed through a known reproduced signal processing circuit, and formed into a reproduced time-division-multiplexed signal shown in FIG. 2(B). The reproduced signal processing circuit comprises a reproducing amplifier 40, an equalizer 41, a highpass filter 42, a frequency demodulator 43, and a de-emphasis circuit 44. The reproduced time-division-multiplexed signal is passed through the switching circuit 12 which is connected to the terminal P, and the lowpass filter 13. The output signal of the lowpass filter 13 is supplied to the AD converter 21, the synchronizing signal separating circuit 19, and an achromatic level signal detecting circuit 45. The output signal of the lowpass filter 13 is also supplied to the AD converter 17, through the switching circuit 16 which is connected to the terminal P. A circuit part which is made up from the AD converter 21, the memory circuits 22 and 23, the switching circuit 24, and the DA converting circuit 26, carries out a time base expansion based on output signals of the control pulse generating device 20 so as to produce a reproduced luminance signal which has been returned to its original time base. As in the case at the time of the recording, when one of the memory circuits 22 and 23 carries out a write-in operation with respect to the time base compressed luminance signal of the reproduced time division-multiplexed signal, the other of the memory circuits 22 and 23 carries out the read-out operation. Further, the memory circuits 22 and 23 alternately carry out the read-out operation and the write-in operation for every 1H. However, unlike at the time of the recording, the repetition frequency of the write-in clock pulse is 20 MHz, for example, and the repetition frequency of the read-out clock pulse is 16 MHz, for example. Accordingly, a reproduced luminance signal which has been time base expanded by 5/4 (that is, time base expanded to the extent the time base compression was performed at the time of the recording), is alternately produced from the memory circuits 22 and 23 for every 1H.

On the other hand, a circuit part which is made up from the AD converter 17, the memory circuit 18, and the DA converting circuit 25, writes the time base compressed color difference signal within the reproduced time-division-multiplexed signal in the memory circuit 18 based on the output signals of the control pulse generating device 20 and thereafter carries out a read-out operation, so as to obtain a line-sequential color difference signal which has been returned to its original time base. In other words, the digital signal of the reproduced time base compressed color difference signal is written in the memory circuit 18 by a write-in clock pulse of 20 MHz, for example, and a digital signal of a reproduced line-sequential color difference signal which has been returned to its original time base by expanding the time base to 5 times, is read out from the memory circuit 18 by a read-out clock pulse of 4 MHz. However, the period in which the memory circuit 18 carries out the write-in operation, is only the transmission period of 10.4 $\mu$s in which the time base compressed color difference signal $(R-Y)_c$ or $(B-Y)_c$ shown in FIG. 2(B) is transmitted. The memory circuit 18 starts to carry out the read-out operation from the time when the write-in operation of terminated, for a period of 52 $\mu$s. Accordingly, the write-in and read-out operations of the memory circuit 18 are essentially stopped for the remaining period of 1.6 $\mu$s.

Figure 13:
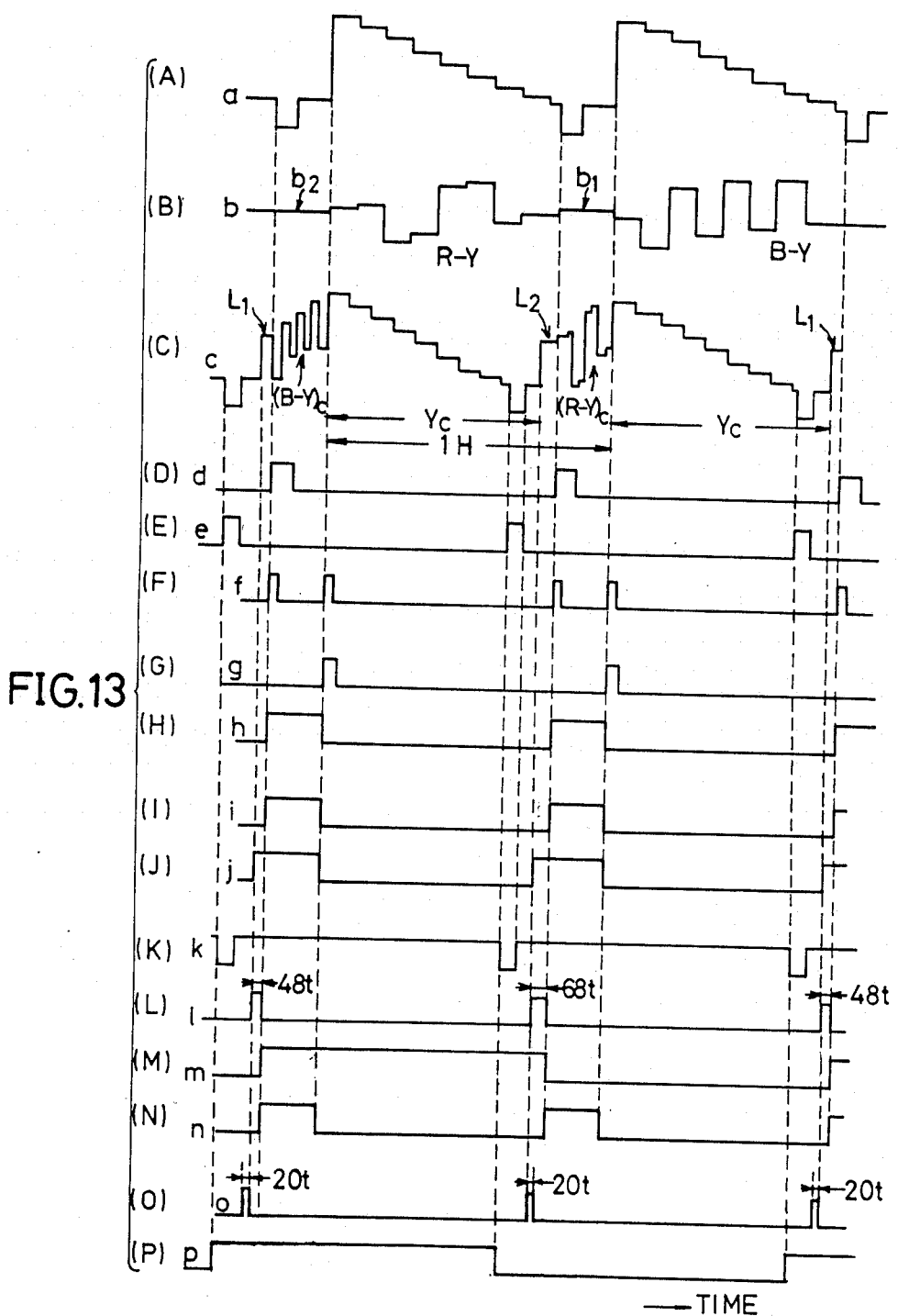
FIGS. 13(A) through 13(P) show signal waveforms for explaining the operations of the circuit system shown in FIG. 11 and a circuit system shown in FIG. 15.

The digital signal of the time base compressed line-sequential color difference signal which has been returned to its original time base, is supplied from the memory circuit 18 to the DA converting circuit 25 wherein the digital signal is converted into an analog reproduced line-sequential color difference signal. The analog reproduced line-sequential color difference signal is supplied to a first input terminal of an encoder 47. On the other hand, as will be described later on in the specification, the achromatic level signal detecting circuit 45 detects the pulse width of the achromatic level signals L1 and L2 shown in FIG. 2(B) from the reproduced time-division-multiplexed signal, based on a control pulse from the control pulse generating device 20. The achromatic level signal detecting circuit 45 forms a color difference signal discriminating signal based on the detected pulse width, and supplies this color difference signal discriminating signal to a second input terminal of the encoder 47. As shown in FIG. 13(P) which will be described later on in the specification, the color difference signal discriminating signal assumes a high level during the transmission period of the color difference signal (B−Y), and assumes a low level during the transmission period of the color difference signal (R−Y), for example. The color difference signal discriminating signal is a symmetrical square wave having a period of 2H.

The encoder 47 gives a predetermined D.C. level difference between the color difference signals (R—Y) and (B—Y) of the reproduced line-sequential color difference signal, before performing a frequency modulation to obtain a frequency modulated signal. Further, the encoder 47 transmits this frequency modulated signal only for a period which excludes a predetermined period of the frequency modulated signal. In other words, the encoder 47 transmits the frequency modulated signal for a period which excludes the period of the horizontal synchronizing signal, the period in the vicinity of the horizontal synchronizing signal, and the like, to produce a frequency modulated signal which is a carrier chrominance signal in conformance with the SECAM system.

The reproduced carrier chrominance signal which is in conformance with the SECAM system and is obtained from an output terminal of the encoder 47, is supplied to a mixing circuit 48 shown in FIG. 1. This reproduced carrier chrominance signal, and the reproduced luminance signal which is obtained from the DA converting circuit 26, are mixed in the mixing circuit 48. As a result, a reproduced color video signal in conformance with the SECAM system, is produced from the mixing circuit 48 through an output terminal 50.

The present invention relates to the synchronizing signal separating circuit 19 of the recording and reproducing apparatus described heretofore. Description will now be given with respect to embodiments of the synchronizing signal separating circuit 19.

Figure 5:
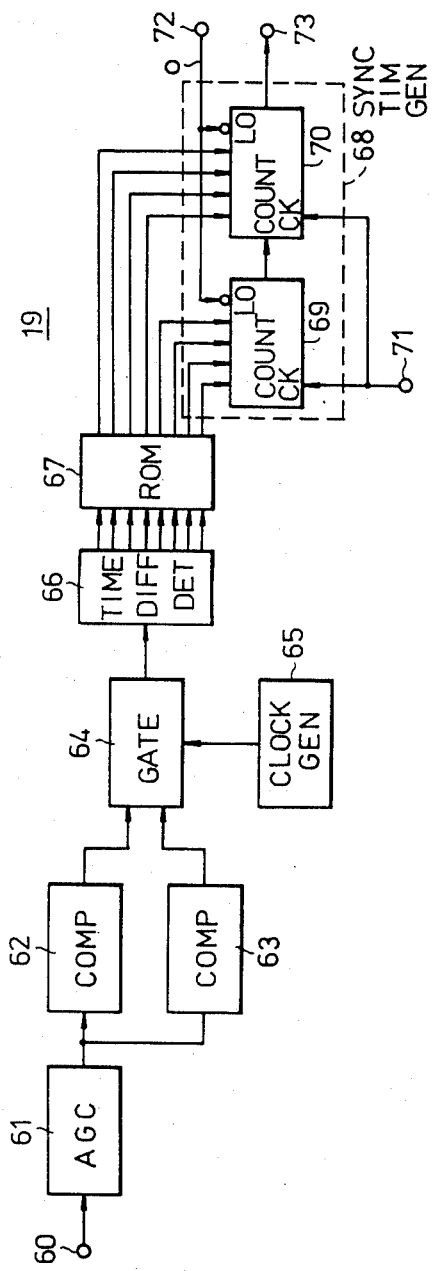
FIG. 5 is a systematic block diagram showing a first embodiment of a synchronizing signal separating circuit according to the present invention.

FIG. 5 shows a first embodiment of the synchronizing signal separating circuit 19. In FIG. 5, the luminance signal of the standard system composite color video signal, which is separated and obtained from the lowpass filter 13, is applied to an input terminal 60 at the time of the recording. The reproduced time-division-multiplexed color video signal shown in FIG. 2(B) from the lowpass filter 13 is applied to the input terminal 60 at the time of the recording. At the time of the recording, there is no deterioration in the waveform of the horizontal synchronizing signal within the luminance signal, and for this reason, the problems described before will not occur. On the other hand, at the time of the reproduction, the original waveform of the horizontal synchronizing signal shown in FIG. 3(A) becomes distorted as shown in FIG. 4(A) or 4(B), due to the recording and reproducing characteristics, the frequency characteristic of the reproducing circuit, or the like. Further, the distortion in the reproduced horizontal synchronizing signal is not constant. The distortion may be large accompanying a large deviation in the slope of the waveform as shown in FIG. 4(A), or the distortion may be small accompanying a small deviation in the slope of the waveform as shown in FIG. 4(B) Accordingly, in the case of the synchronizing signal separating circuit which is designed to slice the horizontal synchronizing signal at a level which is one-half the peak value of the horizontal synchronizing signal so as to obtain a horizontal synchronizing signal detection pulse and produce this horizontal synchronizing signal detection pulse as the separated horizontal synchronizing signal shown in FIG. 3(B), the time it takes for the level to reach one-half the peak value from the starting point of the horizontal synchronizing signal is not always constant. The problems described before occur when this time is not constant.

The synchronizing signal separating circuit 19 shown in FIG. 5 is designed so that the horizontal synchronizing signal can be separated with the accurate time position, even when the waveform of the reproduced horizontal synchronizing signal is distorted. The reproduced time-division-multiplexed signal which is applied to the input terminal 60 at the time of the reproduction, is supplied to an automatic gain control (AGC) circuit 61 wherein the synchronizing tip level of the horizontal synchronizing signal is controlled to a value which is approximately constant. An output signal of the AGC circuit 61 is supplied to first and second comparators 62 and 63. The first comparator 62 compares the level of the reproduced time-division-multiplexed signal and a first reference level I, and produces a pulse signal shown in FIG. 6(B) which assumes a low level during a period in which the level of the reproduced time-division-multiplexed signal is lower than the first reference level I. The first reference level I corresponds to 30% of the peak value of the horizontal synchronizing signal shown in FIG. 6(A) which is within the reproduced time-division-multiplexed signal. On the other hand, the second comparator 63 compares the level of the reproduced time-division-multiplexed signal and a second reference level II, and produces a pulse signal shown in FIG. 6(C) which assumes a low level during a period in which the level of the reproduced time-division-multiplexed signal is lower than the second reference level II. The second reference level II corresponds to 70% of the peak value of the horizontal synchronizing signal shown in FIG. 6(A) which is within the reproduced time-division-multiplexed signal.

Figure 6:
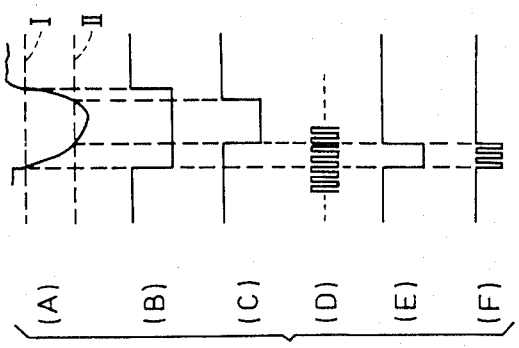
FIGS. 6(A) through 6(F) show signal waveforms for explaining the operation of the block system shown in FIG. 5.

The output signals of the first and second comparators 62 and 63 are respectively supplied to a counting gate 64. The counting gate 64 passes clock pulses shown in FIG. 6(D) which are obtained from a counting clock pulse generator 65, during a time interval between a time when the leading edge (falling edge of the pulse signal shown in FIG. 6(B)) of the output signal of the first comparator 62 is obtained and a time when the leading edge (falling edge of the pulse signal shown in FIG. 6(C)) of the output signal of the second comparator 63 is obtained. In other words, the counting gate 64 passes the clock pulses only during a low-level period of a pulse signal shown in FIG. 6(E) which has a pulse width equal to the above time interval. An output signal of the counting gate 64, are made up of the clock pulses which correspond to the pulse width of the pulse signal shown in FIG. 6(E), as shown in FIG. 6(F). The output signal of the counting gate 64 is supplied to a time difference detecting circuit 66.

The time difference detecting circuit 66 counts the pulses in the signal supplied thereto, and produces a counted value signal indicative of the above time interval. This counted value signal is supplied in parallel to a read only memory (ROM) 67 as an address signal, so as to fetch a correcting data from a table which is stored in the ROM 67. The table stored within the ROM 67, are made up of various correcting data related to the correct generating positions of the horizontal synchronizing signal, for various time intervals between the time when the level of the horizontal synchronizing signal is 30% of the peak value and the time when the level of the horizontal synchronizing signal is 70% the peak value. The correcting data are calculated in advance and stored into the ROM 67 in the form of the table. Hence, when the address signal indicative of the time interval described before is supplied to the ROM 67, an 8-bit correcting data is obtained in parallel from the ROM 67. This 8-bit correcting data corresponds to the above time interval, and causes the generation of the horizontal synchronizing signal at the correct time position.

A synchronizing timing generating circuit 68 comprises counters 69 and 70, and 4 bits of the output signal of the ROM 67 are supplied in parallel to load terminals of the counter 69 while the remaining 4 bits of the output signal of the ROM 67 are supplied in parallel to load terminals of the counter 70. A pulse signal having a frequency in the range of 160 MHz, for example, is supplied from the control pulse generating device 20 to clock terminals of the counters 69 and 70, through a terminal 71. In addition, a pulse signal having a period of 1H as shown in FIG. 13(O) which will be described later on in the specification, is supplied to load terminals of the counters 69 and 70. Accordingly, The correcting data from the ROM 67 is loaded into the counters 69 and 70, and a pulse signal which is obtained by counting the pulses from the terminal 71 with a timing which is in accordance with the loaded correcting data, is produced through a terminal 73. The pulse signal produced through the terminal 73, is generated with an accurate time position as the separated horizontal synchronizing signal.

The synchronizing timing generating circuit 68 may be designed to subject the 8-bit output signal of the ROM 67 to a digital to-analog conversion and then pass the converted analog signal to a sample and hold circuit. In this case, the output horizontal synchronizing signal is also used as a reference voltage for a voltage controlled oscillator (VCO) 195 shown in FIG. 12 which is within a clock pulse generating circuit 126 shown in FIG. 9. The VCO 195 and the clock pulse generating circuit 126 will be described later on in the specification. Further, the pulse signal from the terminal 71 may be used instead of the clock pulse generated from the clock pulse generator 65.

Figure 7:
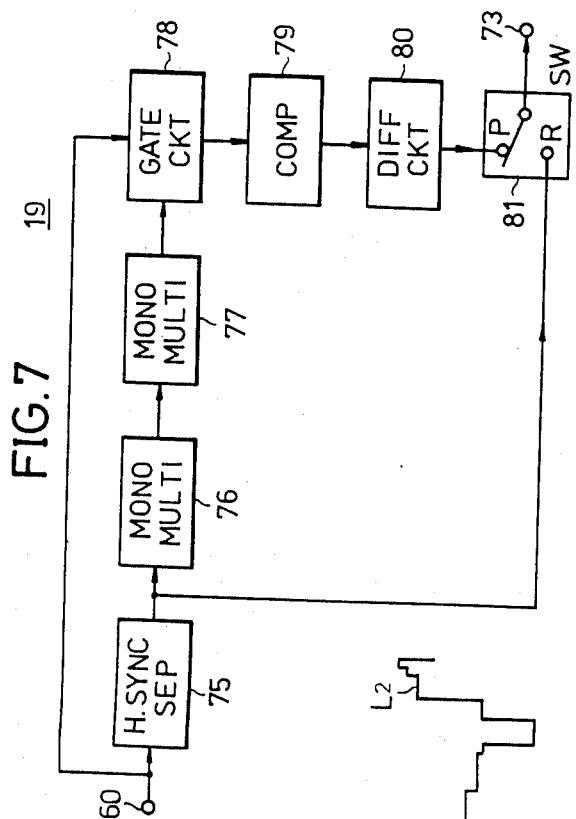
FIG. 7 is a systematic block diagram showing a second embodiment of a synchronizing signal separating circuit according to the present invention.
Figure 8:
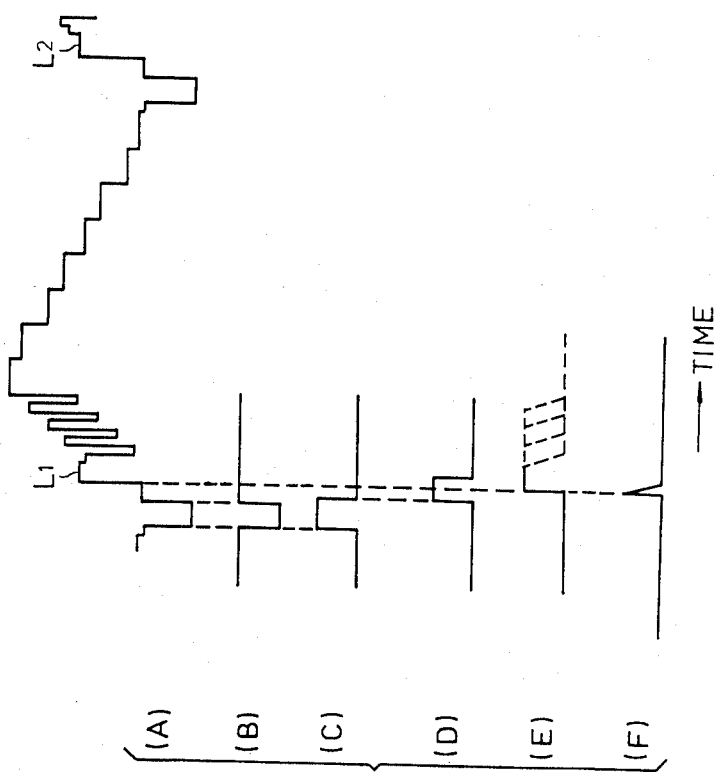
FIGS. 8(A) through 8(F) show signal waveforms for explaining the operation of the block system shown in FIG. 7.

Next, description will be given with respect to a second embodiment of the synchronizing signal separating circuit 19 by referring to FIGS. 7 and 8. In FIG. 7, the luminance signal within the composite color video signal, or the reproduced time-division-multiplexed signal, which is applied to the input terminal 60, is sliced at one-half the peak level of the horizontal synchronizing signal in a horizontal synchronizing signal separating circuit 75 which detects the horizontal synchronizing signal. At the time of the recording, the detected horizontal synchronizing signal is passed through a switching circuit 81 which is connected to a terminal R at the time of the recording, and is produced through the terminal 73. On the other hand, at the time of the reproduction, the switching circuit 81 is connected to a terminal P. Thus, at the time of the reproduction, the detected horizontal synchronizing signal shown in FIG. 8(B) which is detected from the reproduced time-division-multiplexed signal shown in FIG. 8(A) in the horizontal synchronizing signal separating circuit 75, is supplied to a monostable multivibrator 76. The monostable multivibrator 76 is triggered responsive to a rising edge of the detected horizontal synchronizing signal. As a result, the monostable multivibrator 76 produces a pulse signal shown in FIG. 8(C) having a positive polarity pulse of a constant pulse width. The output pulse signal of the monostable multivibrator 76 is supplied to a monostable multivibrator 77 which is triggered responsive to a falling edge of this output pulse signal of the monostable multivibrator 76. The monostable multivibrator 77 produces a pulse signal shown in FIG. 8(D) which always assumes a high level at positions corresponding to starting positions of the achromatic level signals L1 and L2 within the reproduced time-division-multiplexed signal shown in FIG. 8(A)

A gate circuit 78 receives the output pulse signal of the monostable multivibrator 77 shown in FIG. 8(D), as a gate pulse. The gate circuit 78 passes the reproduced time-division-multiplexed signal from the input terminal 60, only during the high-level period of the output pulse signal of the monostable multivibrator 77. Accordingly, a signal part in the vicinity of the achromatic level signal L1 or L2 and at least including the first signal part of the achromatic level signal L1 or L2, is obtained from the gate circuit 78 and supplied to a comparator 79. The comparator 79 compares the level of the signal part supplied thereto, with the level of a reference signal. When a level range from the synchronizing tip level and the white peak level is assumed to be 100%, the level of this reference signal is selected in the range of 50%. In addition, the levels of the achromatic level signals L1 and L2 are selected in the range of approximately 33%. Thus, a pulse signal which rises at each starting position of the achromatic level signals L1 and L2 as shown in FIG. 8(E), is obtained from the comparator 79. The pulse signal from the comparator 79 is supplied to a differentiating circuit 80 and differentiated into a pulse signal having a positive polarity pulse as shown in FIG. 8(F) The output differentiated pulse signal of the differentiating circuit 80 is passed through the switching circuit 81 which is connected to the terminal P, and is produced through the terminal 73 as the separated reproduced horizontal synchronizing signal.

The generating position of the differentiated pulse signal, exists at a position located a predetermined period after the time position of the actual horizontal synchronizing signal In addition, the time base compressed color difference signals exist immediately subsequent to the respective achromatic level signals L1 and L2. Hence, the differentiated pulse signal can be used to separate the time base compressed color difference signals and the time base compressed luminance signal.

In a case where the high-frequency component is emphasized in the pre-emphasis circuit 31 of the recording system, the time position of the reproduced horizontal synchronizing signal deviates when a part of the horizontal synchronizing signal is clipped and discarded in the clipping circuit 32. However, since the achromatic level signal does not exceed the clipping level even when it is subjected to the pre-emphasis, a part of the achromatic level signal will not be discarded by the clipping, and the achromatic level signal can always be transmitted with the correct time position. Accordingly, in the present embodiment, the circuit is uneasily affected by noise and by the clipping in the clipping circuit 32, compared to the case where the horizontal synchronizing signal is simply detected at the time of the reproduction by slicing the horizontal synchronizing signal at a level which is one-half the peak value of the horizontal synchronizing signal. According to the present embodiment, it is always possible to detect the accurate time position of the achromatic level signal and thus indirectly detect the accurate time position of the horizontal synchronizing signal.

In the case where the synchronizing signal separating circuit 19 is used, the read-out timings of the RAMs 22 and 23 are changed so as to match the processing timing of the luminance signal with the delay in the generation of the pulse in the synchronizing signal separating circuit 19. Hence, instead of delaying the output signal of the lowpass filter 13 in a delay circuit and then supplying the delayed signal to the AD converter 21, the switching circuit 16, and the achromatic level signal detecting circuit 45 for the purpose of matching the timing as described above, the output signal of the lowpass filter 13 may be supplied directly to the synchronizing signal separating circuit 19 without passing the output signal of the lowpass filter 13 through such a delay circuit.

Figure 9:
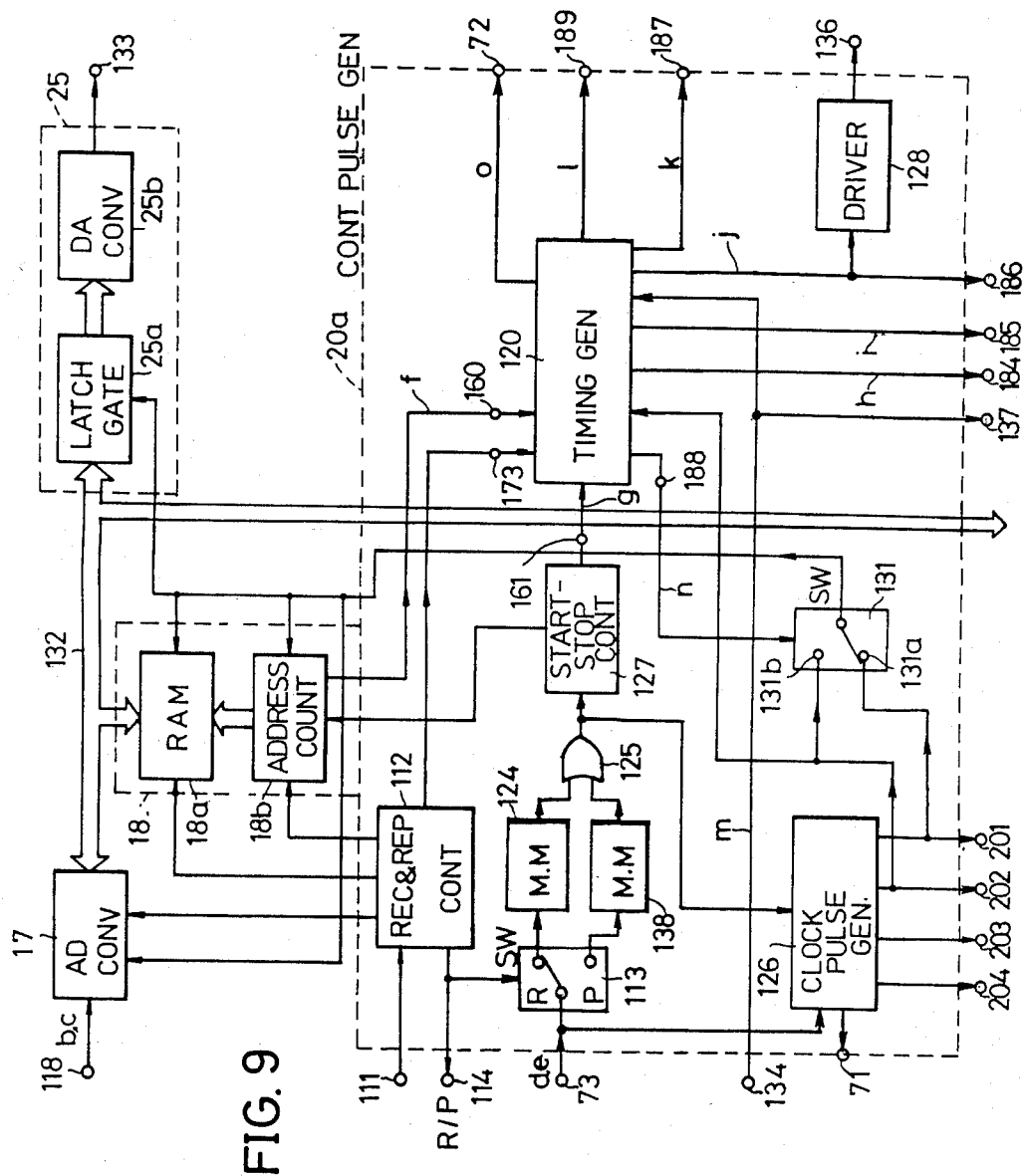
FIG. 9 is a systematic circuit diagram showing an example of a part of a control pulse generating device within the block system shown in FIG. 1.
Figure 10:
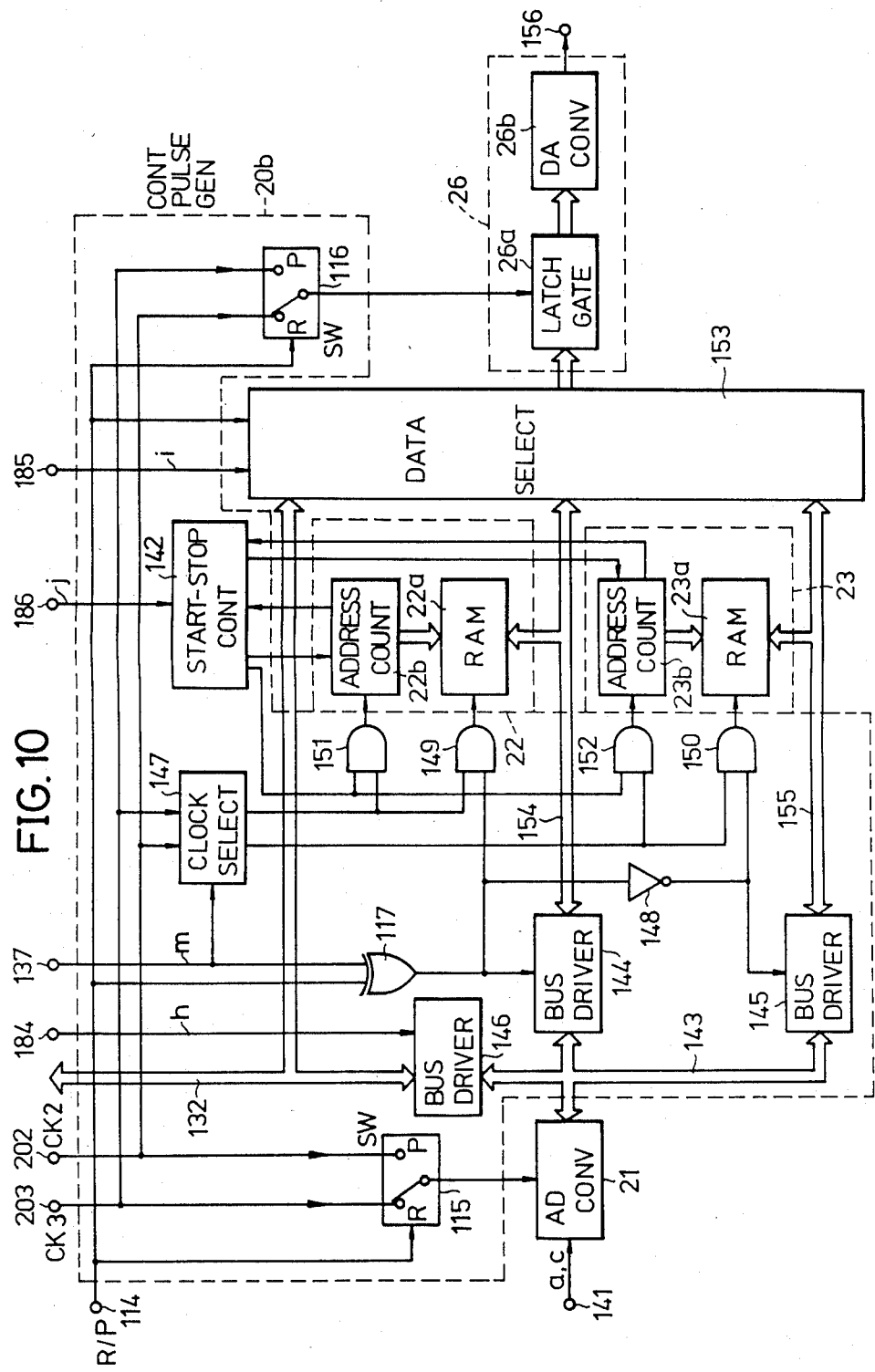
FIG. 10 is a systematic circuit diagram showing an example of a part of the control pulse generating device within the block system shown in FIG. 1.

Next, description will be given with respect to an essential part of the recording and reproducing apparatus shown in FIG. 1. FIGS. 9 and 10 are systematic circuit diagrams respectively showing a circuit part encircled by a phantom line 110 in FIG. 1. In FIGS. 9 and 10, those parts which are the same as those corresponding parts in FIG. 1 are designated by the same reference numerals. A control pulse generating circuit 20a shown in FIG. 9 and a control pulse generating circuit 20b shown in FIG. 10 constitute the control pulse generating device 20 shown in FIG. 1.

First, description will be given with respect to the operation at the time of the recording, by referring to FIGS. 9 and 10. At the time of the recording, a signal from a recording and reproducing switch (not shown) is supplied to a recording and reproduction control circuit 112 through an input terminal 111. An output signal R/P of the recording and reproduction control circuit 112 is applied to a switching circuit 113 to connect this switching circuit 113 to a terminal R. The signal R/P is also supplied to switching circuits 115 and 116 and to an exclusive-OR circuit 117 shown in FIG. 10, through a terminal 114. The switching circuits 115 and 116 are connected to respective terminals R by the signal R/P. The signal R/P is also supplied to the switching circuits 12 and 16 shown in FIG. 1.

The line-sequential color difference signal from the switching circuit 16, is supplied to the AD converter 17 through an input terminal 118 shown in FIG. 9. For example, it is assumed that the color video signal to be recorded is a color bar signal in conformance with the SECAM system as shown in FIG. 2(A). In this case, a line-sequential color difference signal b shown in FIG. 13(B) is applied to the input terminal 118. As may be seen from FIG. 13(B), there is a predetermined level difference between a D.C. level $b_1$ of the achromatic color part (non-modulated carrier part) having the width of 4.9 μs located at the back porch within the period of 1H in which the color difference signal (B−Y) is transmitted, and a D.C. level $b_2$ of the achromatic color part (non-modulated carrier part) having the width of 4.9 μs located at the back porch within the subsequent period of 1H in which the color difference signal (R−Y) is transmitted. This is because the chrominance subcarrier frequency of the carrier chrominance signal is 4.25 MHz for the color difference signal (B−Y) and 4.406 MHz for the color difference signal (R−Y).

On the other hand, a horizontal synchronizing signal d shown in FIG. 13(D) which is obtained from the synchronizing signal separating circuit 19, is passed through the terminal 73, the switching circuit 113, a monostable multivibrator 124, and an OR circuit 125, and is then supplied to the clock pulse generator 126 and a start/stop control circuit 127. An output signal of the start/stop control circuit 127 is supplied to a counter within a timing generator 120, and to an address counter 18b so as to control the counting operation of the address counter 18b The address counter 18b constitutes the memory circuit 18, together with a RAM 18a.

Figure 11:
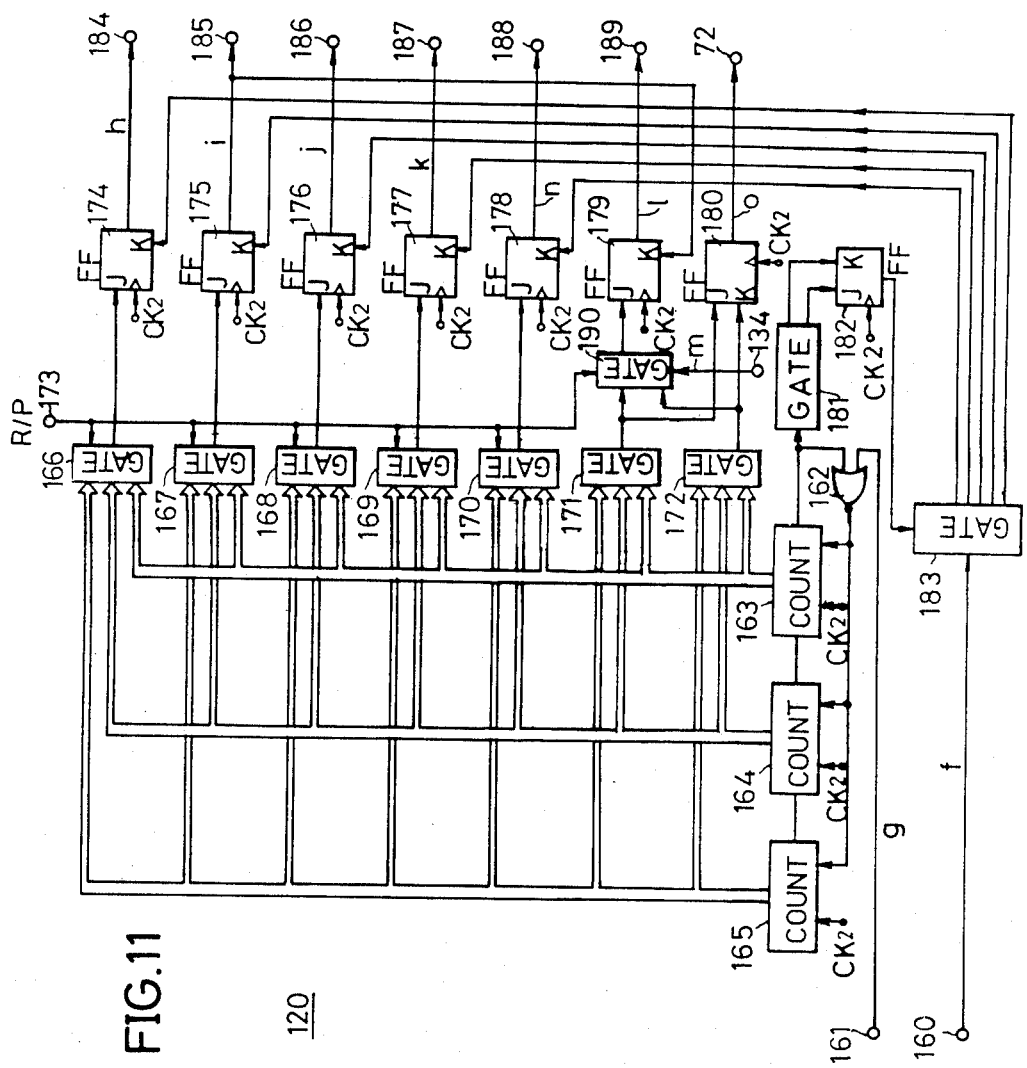
FIG. 11 is a systematic circuit diagram showing an example of a timing generator within the circuit system shown in FIG. 9.

The timing generator 120 generates pulses for determining the timings of circuits within the control pulse generating device 20, and description will now be given with respect to the timing generator 120 by referring to FIG. 11. In FIG. 11, a pulse g shown in FIG. 13(G) from the start/stop control circuit 127, is supplied to a NOR-circuit 162 through an input terminal 161. The NOR-circuit 162 performs a NOR operation between the pulse g from the input terminal 161 and an output signal of a counter 163. An output signal of this NOR-circuit 162 is applied to counters 163, 164, and 165 as a reset pulse. A second clock pulse CK2 of 20 MHz, for example, is supplied to the counters 163 through 164 from the clock pulse generator 126. The counters 163 through 165 count the second clock pulse CK2. A counted value which is made up from output signals of the counters 163 through 165, indicates the most significant digit by the output signal of the counter 163 and indicates the least significant digit by the output signal of the counter 165. This counted value is supplied to gate circuits 166 through 172. The gate circuits 166 through 172 and 190 pass the signals at the counted value which is independently set for the recording and for the reproduction, by the signal R/P which is applied to the gate circuits 166 through 172 and 190 from the recording and reproduction control circuit 112 through a terminal 173, or pass the signals only at the time of the recording or reproduction. The output signals of the gate circuits 166 through 170 are supplied to J terminals of respective J-K flip-flops 174 through 178.

At the time of the recording and at the time of the reproduction, the gate circuit 171 produces a pulse having a pulse width of 48t for every 1H, where t is a period which is 1/1280 times 1H. This output pulse of the gate circuit 171 is supplied to the gate circuit 190 and to a J terminal of a flip-flop 180. At the time of the recording and at the time of the reproduction, the gate circuit 172 produces a pulse having a pulse width of 68t for every 1H, and supplies this pulse to the gate circuit 190 and to a K terminal of the flip-flop 180. The gate circuit 190 passes the incoming signal only at the time of the recording. This gate circuit 190 alternately and selectively produces the output pulses of the gate circuits 171 and 172 for every 1H, responsive to a symmetrical square wave m shown in FIG. 13(M) which is produced from the encoder 14 and has a period of 2H. The output pulse of the gate circuit 190 is supplied to a J terminal of a flip-flop 179. The flip-flop 180 produces a pulse o shown in FIG. 13(O) having a pulse width of 20t (1 μs when 1H is equal to 64 μs) which is a difference between the pulse widths of 68t and 48t described above. This pulse o is produced through the terminal 72.

The clock pulse CK2 described before, is applied to clock terminals of the J-K flip-flops 174 through 180. In addition, the output signal of the counter 163 is supplied to J and K terminals of a J-K flip-flop 182, through a gate circuit 181. The clock pulse CK2 is applied to a clock terminal of the J-K flip-flop 182. An output signal of the J-K flip-flop 182 is supplied to a gate circuit 183. A pulse f shown in FIG. 13(F) from the address counter 18b, which indicates the completion of the count, is applied to the gate circuit 183 through an input terminal 160. The gate circuit 183 passes and supplies this pulse from the input terminal 160 to K terminals of the J-K flip-flops 174 through 178, as a clear pulse, based on the output signal of the J-K flip-flop 182.

Accordingly, the J-K flip-flop 174 normally produces a low-level signal through a terminal 184, at the time of the recording and at the time of the reproduction. However, in a case where only one of the AD converters 17 and 21 is used at the time of the reproduction which will be described later, the J-K flip-flop 174 produces a pulse h shown in FIG. 13(H) only at the time of the reproduction, and produces no pulse at the time of the recording. The J-K flip-flop 175 produces a pulse i shown in , FIG. 13(I) through a terminal 185, only at the time of the recording. This pulse i shown in FIG. 13(I) assumes a high level for a period in which the time base compressed line-sequential color difference signal is transmitted. The J-K flip-flop 175 produces no pulse at the time of the recording. The J-K flip-flop 176 produces a pulse j shown in FIG. 13(J) through a terminal 186, and supplies this pulse to a driver 128 shown in FIG. 9 and to a start/stop control circuit 142 shown in FIG. 10.

The J-K flip-flop 177 produces through a terminal 187, a pulse k shown in FIG. 13(K) having a width of approximately 4 μs and a period of 1H. This pulse k is supplied to the achromatic level signal detecting circuit 45. The J-K flip-flop 178 produces a pulse n shown in FIG. 13(N) through a terminal 188, and supplies this pulse n to a switching circuit 131 shown in FIG. 9 as a switching pulse. Further, the J-K flip-flop 179 produces a pulse l only at the time of the recording. As shown in FIG. 13(L), the pulse l has a pulse width of 48t immediately prior to the color difference signal (R−Y) and a pulse width of 68t immediately prior to the color difference signal (B−Y). This pulse l is produced through a terminal 189 and supplied to the achromatic level signal adding circuit 30.

Figure 12:
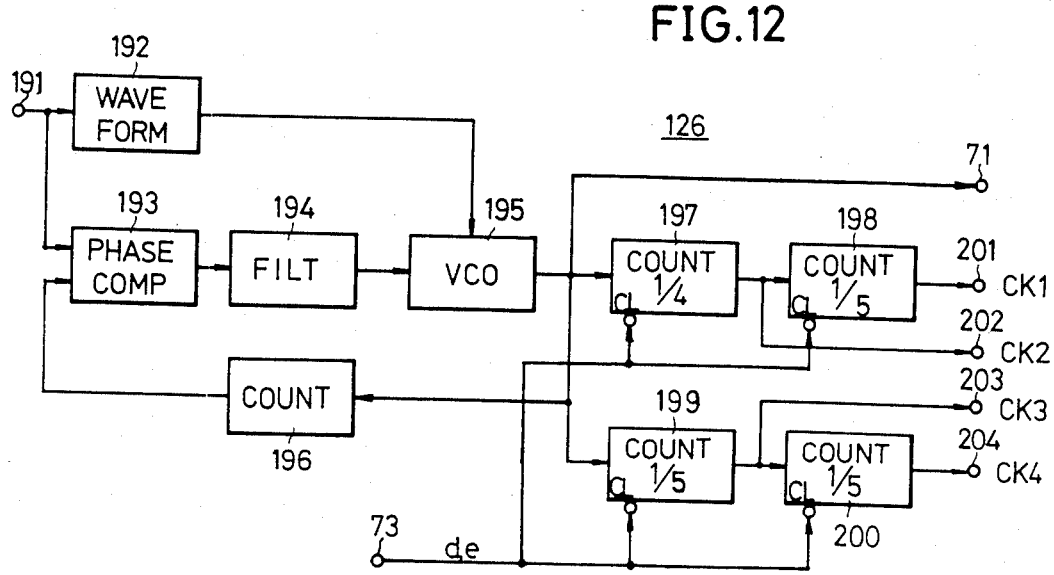
FIG. 12 is a systematic block diagram showing an example of a clock pulse generating circuit within the circuit system shown in FIG. 9.

The clock pulse generator 126 shown in FIG. 9, has a construction shown in FIG. 12. The signal from the OR-circuit 125 shown in FIG. 9, is applied to an input terminal 191 shown in FIG. 12. The signal from the input terminal 191 is supplied to a wave forming circuit 192 and to a phase comparator 193. The phase comparator 193, a filter 194, the voltage controlled oscillator (VCO) 195, and a counter 196 constitute a known phase locked loop (PLL). The VCO 195 in this PLL produces a signal which has a frequency of 80 MHz, for example, and is in phase with the horizontal synchronizing signal, because the VCO 195 is reset by an edge (coincides with the rising edge of the horizontal synchronizing signal) of the output signal of the wave forming circuit 192. The response frequency of the PLL is set so that the PLL can sufficiently follow the time base deviation in the horizontal synchronizing signal which is reproduced in the recording and reproducing apparatus. This measure is taken because, in a case where the sampling does not always start with the same timing when performing the compression and expansion of the time base, the color irregularity will occur proportionally to the expansion rate with which the deviation at the time of the compression is expanded. In addition, when the PLL does not sufficiently follow the time base deviation in the reproduced horizontal synchronizing signal, the color difference signals and the luminance signal will deviate on the reproduced picture, due to the difference in the time base compression rate of the time base compressed luminance signal and the time base compressed line-sequential color difference signal, and the like The output signal of the VCO 195 is frequency-divided by $\frac{1}{4}$ in a counter 197, and is further frequency-divided by 1/5 in a counter 198. The counter 197 produces the second clock pulse CK2 through a terminal 202. On the other hand, the counter 198 produces a first clock pulse CK1 through a terminal 201. At the same time, the output signal of the VCO 195 is frequency-divided by 1/5 in a counter 199, and is further frequency-divided by 1/5 in a counter 200. The counter 199 produces a third clock pulse CK3 through a terminal 203, and the counter 200 produces a fourth clock pulse CK4 through a terminal 204. The frequency of the output signal of the VCO 195 is 80 MHz, for example. Accordingly, the frequencies of the clock pulses CK1, CK2, CK3, and CK4 respectively are 4 MHz, 20 MHz, 16 MHz, and 3.2 MHz. At the time of the recording, a fifth clock pulse CK5 which is obtained through the switching circuit 131, has a repetition frequency of 4 MHz which is equal to the frequency of the first clock pulse CK1. The counters 197 through 200 are respectively cleared responsive to the output horizontal synchronizing signal of the synchronizing signal separating circuit 19. In addition, the output signal of the VCO 195 is supplied to the counters 69 and 70 shown in FIG. 7, through the terminal 71.

Returning now to the description of FIG. 9, the line-sequential color difference signal is subjected to an analog-to-digital conversion in the AD converter 17, based on the fifth clock pulse CK5 of 4 MHz. For example, the line-sequential color difference signal is converted into a digital line-sequential color difference signal having a quantization number of 6 bits for one picture element. This digital line-sequential color difference signal from the AD converter 17 is supplied to the RAM 18a, through a bi-directional data bus 132. This RAM 18a and the address counter 18b are supplied with the fifth clock pulse CK5 of 4 MHz, and the digital line-sequential color difference signal is written into the RAM 18a at an address which is designated by the address counter 18b. This write-in to the RAM 18a starts at the beginning of the video period of 52 μs. The timing with which the above write-in is performed may be accurately determined, by delaying the timing by an interval between the horizontal synchronizing signal and the beginning of the video period, in the monostable multivibrator 124 which is triggered by the horizontal synchronizing signal d shown in FIG. 13(D), and by thereafter starting the operation of the timing generator 120 by the start/stop control circuit 127.

When the RAM 18a completes the write-in of the color difference signal (R−Y) or (B−Y) of the video period of 52 μs, the RAM 18a is controlled by an output signal of the recording and reproduction control circuit 112 so that a read-out operation is started after approximately 1.6 μs has elapsed. Moreover, the switching circuit 131 is switched over by the pulse n shown in FIG. 13(N) and is connected to a terminal 131b, so as to produce the second clock pulse CK2 as the fifth clock pulse CK5. Thus, after the above period of approximately 1.6 μs has elapsed, the written color difference signal is read out from the RAM 18a by the clock pulse of 20 MHz. Accordingly, the digital color difference signal which has been time base compressed to 1/5, is obtained from the RAM 18a, passed through a latch gate 25a which is applied with the fifth clock pulse CK5 and a DA converter 25b, and is produced through an output terminal 133. In FIG. 13(C), the time base compressed color difference signal (R−Y) is represented by $(R−Y)_C$, and the time base compressed color difference signal (B−Y) is represented by $(B−Y)_C$. The time base compressed line-sequential color difference signal shown in FIG. 13(C) is delayed by 1H with respect to the line-sequential color difference signal b shown in FIG. 13(B). This is because the color difference signal corresponding to the period of 1H is first written into the RAM 18a before it is read out.

The pulse j which is produced through the output terminal 186 of the timing generator 120, is passed through the driver 128, and is supplied to the switching circuit 29 shown in FIG. 1 through an output terminal 136, as a switching pulse which assumes a low level in correspondence with the transmission period of the time base compressed luminance signal. The pulse j is also supplied to the start/stop control circuit 142 shown in FIG. 10, through the output terminal 186.

Next, description will be given with respect to the recording system for the luminance signal. The luminance signal a shown in FIG. 13(A) which is applied to an input terminal 141 shown in FIG. 10, is supplied to the AD converter 21. In the AD converter 21, the luminance signal is converted into a digital luminance signal having a quantization number of 7 bits for one picture element, for example, based on the third clock pulse CK3 which is generated from the timing generator 120 and applied to the AD converter 21 through the terminal 203 and the switching circuit 115. The output digital luminance signal of the AD converter 21 is supplied to bus drivers 144, 145, and 146, through a bi-directional bus 143. At the time of the recording, the bus driver 146 is turned OFF by a signal received from the timing generator 120 through the terminal 184. On the other hand, the above described symmetrical square wave m which has a period of 2H and is obtained from an input terminal 134 through a terminal 137, is applied to a clock selector 147. This clock selector 147 alternately produces the second clock pulse CK2 through one output terminal thereof and the third clock pulse CK3 through another output terminal thereof, for every 1H. The square wave m which is obtained through the terminal 137 is supplied to the bus driver 144, through the exclusive-OR circuit 117. This square wave from the terminal 137 is also supplied to an inverter 148 and to an AND-circuit 149. An output signal of the inverter 148 is applied to the bus driver 145 and to an AND-circuit 150.

Accordingly, the bus drivers 144 and 145 are alternately turned ON for every 1H. The output digital luminance signal of the AD converter 21 is thus passed through the bus driver 144 or 145 which is ON, and then supplied to a RAM 22a or 23a. The digital luminance signal supplied to the RAM 22a or 23a, is written into the RAM 22a or 23a at an address which is designated by an address counter 22b or 23b, by the third clock pulse CK3. One of the clock pulses CK2 and CK3, is supplied to the address counters 22b and 23b through respective AND-circuits 151 and 152. The same clock pulse is produced from the AND-circuits 149 and 151, and the same clock pulse is produced from the AND-circuits 150 and 152. An output which is read out by the second clock pulse CK2, is obtained from the RAM 22a or 23a which is connected through the data bus to the bus driver 144 or 145 which is OFF. The frequencies of the second and third clock pulses CK2 and CK3 are 20 MHz and 16 MHz, respectively. Thus, a digital luminance signal which has been time base compressed by 20% of the video period, is alternately obtained from the RAMs 22a and 23a for every 1H, and is supplied to a data selector 153. This data selector 153 constitutes the switching circuit 24 shown in FIG. 1.

As in the case of the write-in to the RAM 18a described before, the write-in of the luminance signal to the RAMs 22a and 23a is started at the beginning of the video period of 52 μs. Based on the signal R/P from the terminal 114 and the signal i shown in FIG. 13(I) from the terminal 185, the data selector 153 turns ON a data bus 155 from the bus driver 145 when the bus driver 144 is OFF, and turns ON a data bus 154 from the bus driver 144 from the data bus 144 when the bus driver 145 is OFF, and connects to a latch gate 26a. Accordingly, the read-out data from one of the RAMs 22a and 23a which is performing the read-out operation, is supplied to the latch gate 26a within the DA converting circuit 26, through the data selector 153. The read-out data is latched in the latch gate 26a, by the second clock pulse CK2 of 20 MHz which is supplied to the latch gate 26a from the terminal 202 through the switching circuit 116. The latched output of the latch gate 26a is converted into an analog signal in a DA converter 26b, and is produced through an output terminal 156 as the time base compressed luminance signal $Y_c$ shown in FIG. 13(C).

Figure 14:
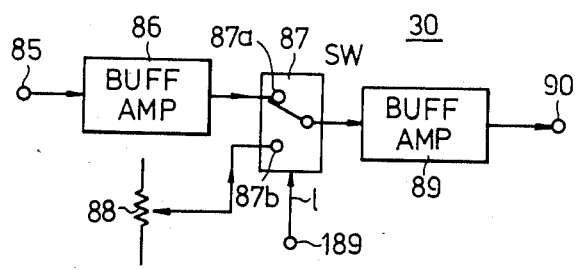
FIG. 14 is a systematic block diagram showing an example of an achromatic level signal adding circuit within the block system shown in FIG. 1.

The time base compressed luminance signal $Y_c$ and the time base compressed line-sequential color difference signal are subjected to a time-division-multiplexing, and the time-division-multiplexed signal is supplied to the achromatic level signal adding circuit 30 shown in FIG. 14. The time-division-multiplexed signal is supplied to a terminal 87a of a switching circuit 87 within the achromatic level signal adding circuit 30, through an input terminal 85 and a buffer amplifier 86 of the achromatic level signal adding circuit 30. A D.C. voltage of the achromatic level is constantly applied to a terminal 87b of the switching circuit 87, from a level adjusting variable resistor 88. The switching of the switching circuit 87 is controlled responsive to the pulse l shown in FIG. 13(L) which is produced through the terminal 189 of the timing generator 120. The switching circuit 87 is connected to the terminal 87b during the high-level period of the pulse l, and is connected to the terminal 87a during the low-level period of the pulse l. Accordingly, the D.C. voltage which is selected to the achromatic level and is obtained from the variable resistor 88, is selectively produced as the achromatic level signals L1 and L2 shown in FIG. 13(C) in the respective period of 48t immediately prior to the time base compressed color difference signal $(B-Y)_c$ and the period of 68t immediately prior to the time base compressed color difference signal $(R-Y)_c$.

Therefore, the time-division-multiplexed signal c shown in FIG. 13(C) is obtained from the switching circuit 87, and is produced from a buffer amplifier 89 through an output terminal 90.

Next, description will be given with respect to the operation at the time of the reproduction. At the time of the reproduction, the switching circuits 113, 115, and 116 are switched over and connected to respective terminals P by the signal R/P. The reproduced time-division-multiplexed signal c shown in FIG. 13(C) is applied to the input terminal 118 shown in FIG. 9 and to the input terminal 141 shown in FIG. 10, through the lowpass filter 13 shown in FIG. 1. The reproduced time-division-multiplexed signal c applied to the input terminal 118, is supplied to the AD converter 17. The reproduced time-division-multiplexed signal applied to the input terminal 141, is supplied to the AD converter 21. The reproduced horizontal synchronizing signal e shown in FIG. 13(E) which is applied to the input terminal 73 shown in FIG. 9, is supplied to a monostable multivibrator 138 through the switching circuit 113, and is subjected to a wave-shaping in the monostable multivibrator 138. An output pulse of the monostable multivibrator 138 is supplied to the clock pulse generator 126 through the OR-circuit 125. The clock pulse generator 126 generates the four kinds of clock pulses CK1, CK2, CK3, and CK4 described before.

The switching of the switching circuit 131 is controlled by the switching pulse n shown in FIG. 13(N) which is generated from the timing generator 120 and applied to the switching circuit 131 through the terminal 189. The switching circuit 131 is switched over and connected to the terminal 131b and selectively passes the second clock pulse CK2, for a period in which the switching pulse n shown in FIG. 13(N) assumes a high level. On the other hand, the switching circuit 131 is switched over and connected to a terminal 131a and selectively passes the first clock pulse CK1, for a period in which the switching pulse n shown in FIG. 13(N) assumes a low level. At the time of the reproduction, the RAM 18a is controlled to perform the write-in operation for a period in which the switching circuit 131 produces the second clock pulse CK2, and to perform the read-out operation for a period in which the switching circuit 131 produces the first clock pulse CK1. Accordingly, a digital line-sequential color difference signal which has been time base expanded to 5/1 and returned to its original time base, is obtained from the RAM 18a and supplied to the latch gate 25a wherein the digital line-sequential color difference signal is latched. The output digital signal of the latch gate 25a is passed through the DA converter 25b and is produced through the output terminal 133.

The digital signal which is produced from the AD converter 21 by the analog-to-digital conversion performed therein based on the second clock pulse CK2 from the switching circuit 115, is supplied to the bus drivers 144, 145, and 146. The bus driver 146 is constantly turned OFF. On the other hand, the bus drivers 144 and 145 are alternately turned ON for every 1H. At the time of the reproduction, the transmission paths of the clock pulses CK2 and CK3 are switched over, and the RAMs 22a and 23a perform the write-in operation at 20 MHz and perform the read-out operation at 16 MHz. Thus, a digital signal which has been time base expanded to 5/4, is supplied to the latch gate 26a through the data selector 153. This time base expanded digital signal is latched in the latch gate 26a, based on the third clock pulse CK3 from the switching circuit 116. The output signal of the latch gate 26a is passed through the DA converter 26b, and is produced through the output terminal 156 as a reproduced luminance signal which has been returned to its original time base as shown in FIG. 13(A). The reproduced time base compressed line-sequential color difference signal and the reproduced time base compressed luminance signal are respectively time-division-multiplexed as shown in FIGS. 2(B) and 13(C), but these reproduced time base compressed signals can be separated in the data selector 153.

The lowpass filter 46 and the switching circuits 16 and 27 may be omitted, by appropriately operating the bus driver 146 and the data selector 153. In other words, at the time of the recording, the digital line-sequential color difference signal is stored in the RAM 18a by an operation similar to the operation described previously for the time of the recording. In this state, the timing generator 120 is caused to generate a signal which is identical to the signal j shown in FIG. 13(J), and this signal is supplied to the data selector 153. The bi-directional data bus 132 and the latch gate 26a are connected through the data selector 153, only for a period in which the signal supplied to the data selector 153 assumes a high level. For a period in which the signal j supplied to the data selector 153 assumes a low level, the data bus 154 or 155 which is connected to the RAM 22a or 23a which is performing the read-out operation as described previously for the time of the recording, is connected to the latch gate 26a through the data selector 153. As a result, the time-division-multiplexed signal c shown in FIG. 2(B) or FIG. 13(C), can be produced through the output terminal 156. Such an operation is possible because the luminance signal processing system including the RAMs 22a and 23a does not operate for a period in which the signal shown in FIG. 13(J) assumes a high level.

On the other hand, at the time of the reproduction, the reproduced time-division-multiplexed signal c shown in FIGS. 2(B) and 13(C) is supplied to the AD converter 21 through the input terminal 141. The operation of the AD converter 17 is stopped, and the signal shown in FIG. 13(H) is supplied to the bus driver 146 from the timing generator 120. For a period in which this signal supplied to the bus driver 146 assumes a high level, the bus driver 146 is turned ON to connect the output of the AD converter 21 and the bi-directional data bus 132, so as to write the reproduced time base compressed line-sequential color difference signal in the RAM 18a. On the other hand, for a period in which the signal h shown in FIG. 13(H) assumes a low level, the bus driver 146 is turned OFF, so as to read out the time base expanded line-sequential color difference signal from the RAM 18a as described previously. The reproduced line-sequential color difference signal can be obtained in this manner. In this case, the reproduced time base compressed luminance signal can be time base expanded by an operation similar to the operation described previously.

Figure 15:
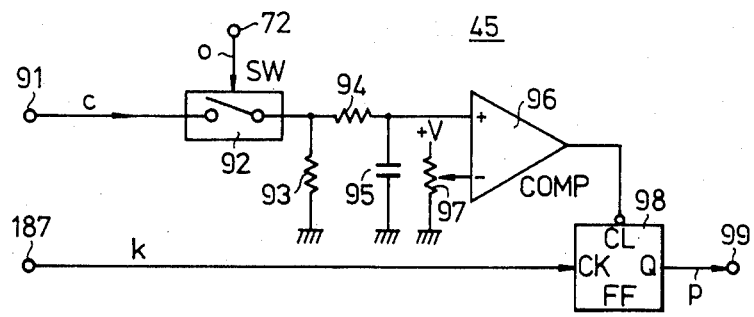
FIG. 15 is a systematic circuit diagram showing an example of an achromatic level signal detecting circuit within the block system shown in FIG. 1.

FIG. 15 is a systematic circuit diagram showing the achromatic level signal detecting circuit 45. The reproduced line-sequential color difference signal c shown in FIG. 13(C) is supplied to a switching circuit 92, through an input terminal 91. The switching circuit 92 selectively passes the reproduced line-sequential color difference signal c only during a high-level period of the pulse o which is supplied thereto through the terminal 72. The output signal of the switching circuit 92 is passed through a circuit comprising resistors 93 and 94 and a capacitor 95, and is applied to a non-inverting input terminal of a comparator 96. The level of the signal supplied to the non-inverting input terminal of the comparator 96, is compared with the level of a reference voltage from a variable resistor 97. As may be seen from FIGS. 13(C) and 13(O), the switching circuit 92 only produces the achromatic level signal L2, and does not produce the achromatic level signal L1. Accordingly, the output signal of the comparator 96 assumes a high level only when the achromatic level signal L2 is supplied thereto. The high-level output signal of the comparator 96 clears a flip-flop 98.

The pulse k which is obtained from the terminal 187 and has the period of 1H, is applied to a clock terminal of the flip-flop 98. Thus, the flip-flop 98 produces a symmetrical square wave p shown in FIG. 13(P) having a period of 2H. The symmetrical square wave p assumes a high level during the transmission period of the reproduced color difference signal (B−Y) and assumes a low level during the transmission period of the reproduced color difference signal (R−Y). This symmetrical square wave p is produced through an output terminal 99.

The present invention may also be applied to the recording and reproducing apparatuses for recording and reproducing the PAL system color video signal and the SECAM system color video signal. However, in the case of these video signal, it is necessary to demodulate the carrier chrominance signal and then convert the demodulated carrier chrominance signal into a line-sequential color difference signal, in the decoder 14. In addition, it is necessary to simultaneously obtain the color difference signals from the reproduced line-sequential color difference signal, in the encoder 47.

Further, the present invention is not limited to these embodiments, but various variations and modifications may be made without departing from the scope of the present invention.

What is claimed is:

1. A synchronizing signal separating circuit for a color video signal recording and reproducing apparatus which records a time-division-multiplexed signal on a recording medium, said time-division-multiplexed signal having a time base compressed luminance signal and one of two kinds of time base compressed color difference signals time-division-multiplexed within one horizontal scanning period and having the two kinds of time base compressed color difference signals time-division-multiplexed in line-sequence with the time base compressed luminance signal, said time base compressed luminance signal and said time base compressed color difference signal being subjected to a time base compression responsive to a clock pulse which is formed based on an output signal of said synchronizing signal separating circuit, said recording and reproducing apparatus reproducing said time-division-multiplexed signal from the recording medium, said reproduced time-division-multiplexed signal being subject to a time base expansion responsive to a clock pulse which is formed based on an output signal of said synchronizing signal separating circuit so as to obtain a reproduced luminance signal and a reproduced line-sequential color difference signal which are returned to an original time base, said time-division-multiplexed signal having an achromatic level signal time-division-multiplexed between said time base compressed luminance signal and one of said time base compressed color difference signals, said achromatic level signal having a level which is approximately in a center of a level range from a pedestal level to a white peak level of said time base compressed luminance signal, having a transmission period which alternately changes for every one horizontal scanning period and havng a period of two horizontal scanning periods, said synchronizing signal separating circuit comprising:

an input terminal for receiving a composite color video signal to be recorded at the time of a recording, and for receiving said time-division-multiplexed signal at the time of a reproduction;

a horizontal synchronizing signal separating circuit for generating a signal by slicing a horizontal synchronizing signal within said time-division-multiplexed signal received through said input terminal at approximately one-half a peak value of the horizontal synchronizing signal;

pulse generating means for delaying the output signal of said horizontal synchronizing signal separating circuit and for generating a first pulse which exists at a such time position that a leading edge of said achromatic level signal exists within the width of said first pulse; and detecting means supplied with said first pulse from said pulse generating means and the output signal of said horizontal synchronizing signal separating circuit for generating a second pulse in phase with a leading edge of said achromatic level signal, said second pulse being produced at the time of the reproduction as a separated horizontal synchronizing signal.

2. A synchronizing signal separating circuit as claimed in claim 1 in which said detecting means comprises a gate circuit for passing the output signal of said horizontal synchronizing signal separating circuit during a period corresponding to the pulse width of said first pulse received from said pulse generating means, a comparator for comparing levels of an output signal of said gate circuit and a reference signal having a level which is approximately one-half the peak value of said time-division-multiplexed signal, and a differentiating circuit for differentiating an output signal of said comparator and for generating said second pulse.

3. A synchronizing signal separating circuit as claimed in claim 1 which further comprises a switching circuit for selectively supplying the output signal of said horizontal synchronizing signal separating circuit to an output terminal of said synchronizing signal separating circuit at the time of the recording, and for selectively supplying said second pulse obtained from said detecting means to said output terminal of said synchronizing signal separating circuit at the time of the reproduction.

* * * * *